United States Patent [19]
Enderle

[11] Patent Number: 4,936,395
[45] Date of Patent: Jun. 26, 1990

[54] FASTENING DEVICE WITH A SCREW AND A PULSATING TOOL FOR UNIVERSAL FASTENINGS

[75] Inventor: Markus Enderle, Stein, Switzerland
[73] Assignee: Pat AG., Herisau, Switzerland
[21] Appl. No.: 169,673
[22] Filed: Mar. 18, 1988
[30] Foreign Application Priority Data
Mar. 24, 1987 [CH] Switzerland .................... 1109/87
[51] Int. Cl.$^5$ .................... B25B 23/00; F16B 25/10
[52] U.S. Cl. .................... 173/93.5; 173/163; 81/463
[58] Field of Search .................... 173/93.5, 93.6, 163; 81/463–466

[56] References Cited

U.S. PATENT DOCUMENTS

| 1,954,620 | 4/1934 | Connell | 173/93.6 |
| 2,126,673 | 8/1938 | Smith, Jr. | 173/93.6 |
| 2,724,299 | 11/1955 | Amtsberg | 173/93.6 X |
| 3,319,723 | 5/1967 | Kramer | 173/93.6 |
| 4,572,720 | 2/1986 | Rockenfeller et al. | 411/394 X |

Primary Examiner—Douglas D. Watts
Assistant Examiner—Rinaldi Rad
Attorney, Agent, or Firm—Helfgott & Karas

[57] ABSTRACT

A fastening device comprises a screw (2) and a pulsating tool in which the pulsating tool has a driving part which applies pulsations to a driven part in such a way that the resulting pulsating force is exerted tangentially to the direction of thread. For this purpose the driving part and driven part are in each case provided with bodies striking against one another and whose shape is adapted to produce the appropriately direction pulsations. The screw preferably has a hexagonal head which fits within a hexagonal socket in the pulsating tool. The tip of the screw may also be constructed to act as a drill. For inserting the screw, generally a hole is drilled and the screw inserted into it. The screw can be screwed into virtually all materals, such as concrete, brick, wood and wooden slats. As no dowels are required, the fastening method is more reliable and durable.

7 Claims, 2 Drawing Sheets

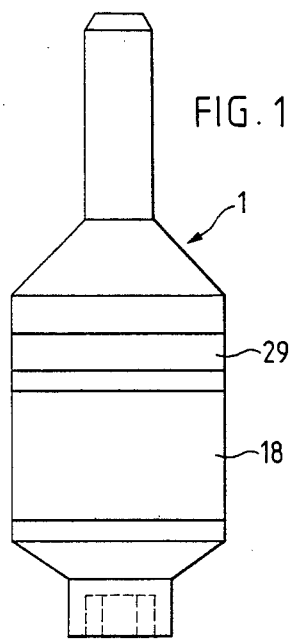
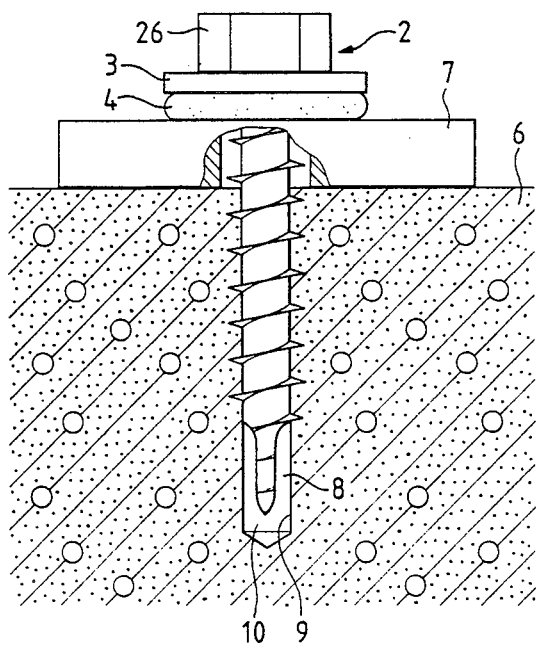
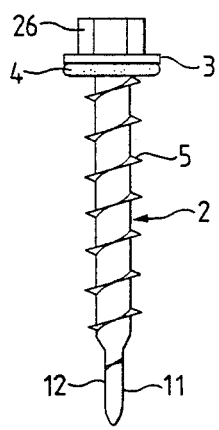
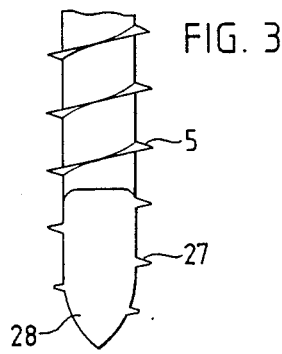
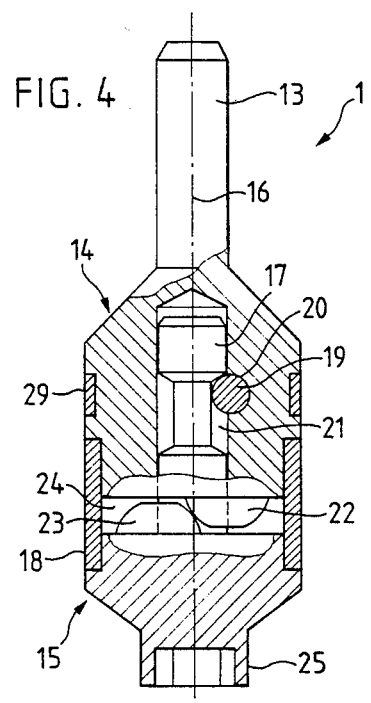

FASTENING DEVICE WITH A SCREW AND A PULSATING TOOL FOR UNIVERSAL FASTENINGS

BACKGROUND OF THE INVENTION

The invention relates to fastening devices, and more particularly to mechanically driven screw type fastening devices.

For fastening objects, such as door frames, gates, pictures, lamps, etc. made of different support materials, different fastening means have hitherto been used as a function of the support material.

On wooden beams and walls use has been made of wood screws, and on concrete walls use has been made of plastic or metal dowels with screws. Other fastening means are often used in walls made from brick, plaster and wooden slats. Thus a complete series of different fixing and fastening means are required, which must be stored and carried along. In addition, not only are different screw sizes required, but also different dowel sizes, which once again makes storage more difficult and requires additional transportation capacity.

A further disadvantage of the known fastening means is that for fastening in concrete and brick walls, usually metal and plastic dowels have to be used. After a number of years, such dowels have a tendency to become detached, because generally they exert a spring tension on the walls of the hole, which consequently decreases slightly over a period of time. Moreover, the material of plastic dowels becomes brittle after a few years or loses its initial properties, so that the dowels are rendered unsuitable for very many applications.

SUMMARY OF THE INVENTION

In order to overcome these disadvantages, various screws have been developed for the most frequently employed materials. For example, a self-tapping screw or a self-tapping, self-drilling screw. The two constructions are intended for use with a screwdriver or an impact wrench.

One disadvantage of these constructions is that the screw and its thread are designed without taking account of the driving mechanism. Thus, the screws are not matched to the impact wrench and vice versa, so that there is no optimun interaction between the two.

Therefore, an object of the present invention is to provide a fastening device of the aforementioned type, which permits a significant reduction in the hitherto required number of fastening means, without reducing the holding characteristics of the means used as compared with the known constructions.

Another object is to provide a dowel-less fastening device thereby to avoid the relatively easily damageable fastening mode and shortened life of dowels, particularly plastic dowels and the storage associated therewith.

In accord with the broad aspects of the invention, a fastening device is provided comprising a threaded screw and a pulsating tool for driving the screw in which pulsations are produced in response to a uniform rotary motion of the tool which are in a direction tangential to the screw threads and in the planes thereof. In accord with further aspects of the invention, the pulsating tool has a driving part and a driven part each containing respective elements which strike against one another during each rotation in a manner such that the resulting force of the pulsation is directed in accordance with the thread pitch. The screw has a hexagonal head which fits within and receives the impact force through a hexagonal socket in the tool. The top of the screw acts as a drill with a portion thereof having a frustum-like circumferential casing forming an angle of between 2° and 10° with the screw axis. The tip of the screw may also be compressed parallel on opposite sides.

This inventive solution not only greatly reduces the storage requirements, but also the quantity of fastening parts to be carried to a building site and this is helped by the obviation of dowels. Costs are greatly reduced through the reduced storage requirements and the transportation problem in connection with deliveries site is simplified.

The elimination of the plastics which are subject to relatively rapid ageing also improves the life of the fastenings produced compared with the known constructions, so that loosening of a fastening made becomes more rare and, if it does occur, this takes place much later.

BRIEF DESCRIPTION OF THE DRAWINGS

An embodiment of the invention is described in greater detail hereinafter in connection with the attached drawings, wherein:

FIG. 1 side view of a fastening device comprising a screw and a pulsating tool.

FIG. 2 is a partial section in the longitudinal direction of a screw inserted in a concrete wall.

FIG. 3 shows part of the screw according to FIG. 2 rotated by 90° about its own axis.

FIG. 4 is an axial section through the pulsating tool according to FIG. 1 and

FIG. 1 shows a fastening device comprising a pulsating tool 1 and a screw 2. Onto the screw are drawn a metal disk 3 and a damping element 4, the disk 3 being connected in one piece to the screw and the damping element 4 is made from rubber and non-positively engages on thread 5 of screw 2. To facilitate the turning or rotating process, particularly into concrete, the edge of thread 5 is very sharp.

FIG. 2 shows a partial section through a concrete wall 6 along the axis of a screw 2 inserted therein, which is e.g. used here for fastening a metal ledge 7 to a wall 6. To facilitate the insertion of screw 2, there is a free space 8 between screw 2 and the inner wall 9 of a hole 10. This space 8 is used for receiving material, which is fed with screw 2 towards the interior of hole 10. The free space 8 can in part be produced in that the front portion of the screw is somewhat compressed on facing sides 11 and 12, as shown in FIGS. 1 and 3. The compression facilitates the introduction of the screw into hole 10 in concrete wall 6 and produces a cutting effect. On fixing screw 2 in hole 10 in concrete wall 6, it is important for hole 10 to be somewhat longer than screw 2, so that there is sufficient space for the inwardly moved material. Only then can screw 2 be perfectly screwed into the concrete wall 6.

DETAILED DESCRIPTION OF THE PREFERRED EMBODIMENTS

Figure 5:
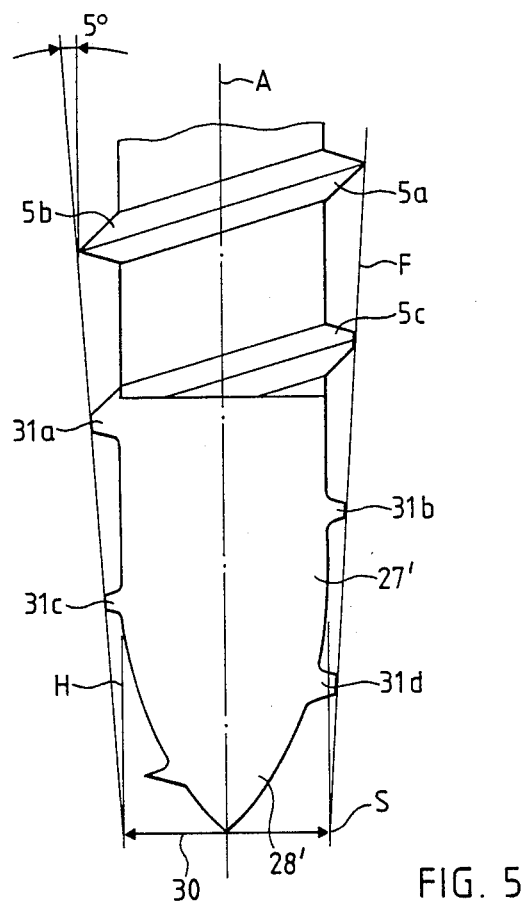
FIG. 5 shows a variant to FIG. 3 on a larger scale.

The pulsating tool 1 comprises a driving part 14 and a driven part 15 and is driven through shank 13 by a conventional manual drilling or screwing machine (not shown). The rotation of this machine transfers via a body 22 in driving part 14 and during each revolution, an impact force to a body 23 in the driven part 15. Bodies 22, 23 are dimensioned in such a way that the resultant force or impact force has a direction corresponding to the thread configuration. More specifically, bodies 22 and 23 each abut one another and slide over one another during rotation and have engaging sides which slope with respect to the rotation axis, thereby to deliver a force in directions tangential to and in the planes of the screw threads and in accordance with the thread pitch. Thus, a maximum effect of the impact force is transferred to the rotary movement of screw 2. The location of body 22 relative to body 23 is such that impact force is only transferred to the screw 2 in the case of clockwise rotation of driving part 14, whereas in the case of anticlockwise rotation the driving part 14 transfers no impact force to the screw 2.

The two bodies 22, 23, respectively held by or integrated with the driving part 14 and driven part 15 rotate about an axis 16, along which extends a shaft 17 of the driven part 15, which is surrounded by a bush 18. The two parts 14, 15 are held together by a cylindrical pin 19, which is inserted in a bore 20 in driving part 14 and engages in a groove 21 of shaft 17. Cylindrical pin 19 is secured by a spring ring 29. The location of pin 19 near the upper end of groove 21 permits body 22 to impact and slide over body 23 during rotation thereby causing the pulsations. The intensity and frequency of pulsation can be varied and even made to be at random frequency by adjusting the slopes of the sides of bodies 22, 23 and/or the axial position of pin 19 within groove 21.

As a result of groove 21, the connection between driving part 14 and driven part 15 is such that upon axial displacement a free rotary movement of parts 14, 15 with respect to one another is possible without engagement of bodies 22, 23. Between the two interengaging parts 14, 15, a suitable grease is provided in the interior 24 for damping and reducing wear. The impact force is transferred by a socket 25 to a hexagon head 26 of screw 2.

Particular significance is attached to the secondary tip 27 and the parallel edges on sides 11 and 12 when inserting screw 2. The material removed is collected in space 8.

The lengths of the parallel edges are dimensioned in such a way that they taper outwards within the conical secondary tip portion 27 shortly before the same have reached their largest diameter. Thus, the following, conically tapering tips (without edges) brings about a smoothing effect in the removed recesses in the substrate.

The primary tip portion 28 is positioned upstream of the smallest diameter of the conical secondary tip portion 27 and assumes the function of a centering means during the cutting process and additionally assumes the function of the drill in soft materials, where no preliminary drilling can take place.

The screwing in process can be controlled by the speed and pressure on the pulsating tool. The energy of the pulsations increases with increasing speed, so that a helical milled slot is formed, which adapts in clearance-free manner to the contour of screw 2.

The screwing in process is ended when the damping element 4 engages with the part 7 to be fastened previously positioned below on the integrated substrate or support surface 3. Through the further turning in of screw 2 the damping element is compressed, so that the radial friction rises and consequently the pulsation is damped. Therefore screw 2 cannot be overtightened.

As a result of the recesses cut into the substrate, the screw 2 can be screwed in and then unscrewed again. This assembly can take place with a pulsating tool having a left-hand action or with a wrench. Screwing in and unscrewing can be repeated one or several times, as a function of the material, without having to replace screw 2 by a screw with larger dimensions.

For the insertion of screw 2 in a wall 6, generally it is first necessary to drill a hole 10, but this is not absolutely necessary in the case of a soft material, e.g. certain types of wood. The diameter of hole 10 always corresponds to the shank diameter of screw 2.

FIG. 5 shows an embodiment of the screw tip with the primary tip portion 28' and the frustum-like secondary tip portion 27', in which the circumferential surface F on center height S intersects the extended sleeve H. In the represented embodiment, the inclination between the circumferential surface F and the screw axis A is approximately 5°. However, this angle can be either larger or smaller and can be in the range e.g. 2° to 10°. It is pointed out in this connection that the front part of the thread of 31a to 31d provided with a sharp edge in the circumferential surface serves to detach this material, so that the following thread 5a to 5c can to a certain extent exercise a smoothing function in the inner thread of the wall of the hole and can be firmly gripped therein.

As no dowels are used, the described fastening type is more durable than the hitherto known constructions. As the thread engages in the material directly and not via dowels, a secure and durable fastening is achieved. The screw can have two threads or one. The construction with two threads normally gives a firmer grip, but that with one thread can be more easily manufactured. Therefore it is largely a cost question as to which of the two constructions is used, the specific intended use also playing a part.

While specific embodiments of the invention have been described herein, many modifications may be made, and it is intended by the appended claims to cover all such modifications as fall within the scope of the appended claims.

What is claimed is:

1. In a combination of a pulsating tool with a screw engaged by said pulsating tool and driven thereby, said pulsating tool being adapted to be mounted to a rotating mechanism for rotating said tool, said tool including a driving part connectable to said rotating mechanism and a driven part for engaging said screw, each of said driving and driven parts including a single shaped element, and means to hold said parts together wherein the shaped element of said driving part cooperates with the shaped element of said driven part so that a rotary movement of said tool results in pulsations thereof and wherein a direction of said pulsations is tangential to a thread of said screw, each shaped element being a substantially flattened roll integral with the respective one of said parts and having two sides sloping in respect to an axis of rotation of said tool, said rolls abutting one another and sliding over one another upon rotation of said tool.

2. A combination according to claim 1, wherein the screw includes a hexagon head, a disk connected in one piece with said head and an annular damping element.

3. A combination according to claim 1, wherein the screw has a hexagonal head and the tool has a hexagonal socket for engaging said screw and imparting rotating and pulsating forces to said screw.

4. A combination according to claim 1, wherein the screw has a primary tip portion and a secondary tip portion positioned above the primary portion, a circumferential casing of the secondary tip portion having a frustum-like configuration and forming an angle of between 2° and 5° with a screw axis.

5. A combination according to claim 4, wherein the casing of the secondary tip portion forms an angle of 5° with the screw axis.

6. A combination according to claim 1, wherein the screw has two parallel threads.

7. A combination according to claim 1, further including a pin for holding said parts together.

* * * * *